United States Patent [19]

Vincent

[11] Patent Number: 5,837,784

[45] Date of Patent: Nov. 17, 1998

[54] METHOD OF MAKING ALKOXYLATED ORGANOSILICONE RESINS AND THE RESINS PRODUCED THEREBY

[75] Inventor: Gary Allen Vincent, Midland, Mich.

[73] Assignee: Dow Corning Corporation, Midland, Mich.

[21] Appl. No.: 662,895

[22] Filed: Jun. 12, 1996

[51] Int. Cl.$^6$ .................................................. C08F 283/00
[52] U.S. Cl. .............................. 525/477; 528/12; 528/32; 528/33; 528/34
[58] Field of Search ................................. 528/12, 32, 33, 528/34; 525/477

[56] References Cited

U.S. PATENT DOCUMENTS

| | | | |
|---|---|---|---|
| 2,676,182 | 9/1954 | Daudt et al. | 260/448.2 |
| 5,091,484 | 2/1992 | Colas et al. | 525/477 |
| 5,324,806 | 6/1994 | Wengrovius et al. | 528/10 |
| 5,352,491 | 10/1994 | Cifuentes et al. | 427/387 |
| 5,352,751 | 10/1994 | Cocco | 528/14 |
| 5,561,203 | 10/1996 | Strong et al. | 525/477 |

OTHER PUBLICATIONS

Dow Corning Corporation, Midland, MI Corporate Test Method: Composition–Silicon Functionality–Tetraethoxysilane Derivatization–Gas Chromatography–Noramlized Composition. Oct. 1, 1971; pp. 1–4.

*Primary Examiner*—Melvyn I. Marquis
*Attorney, Agent, or Firm*—Arne R. Jarnholm

[57] ABSTRACT

Alkoxylated organosilicone resins are made by reacting an MQ resin with alkoxysilanes in the presence of a catalytic amount of a base catalyst. The alkoxy silanes may include numerous organo groups such as alkyl, alkenyl, aryl, arylalkyl, epoxy, ether, alkylamide, alkylamine which are also incorporated into the structure of the alkoxylated organosilicone resin so-made.

21 Claims, No Drawings

METHOD OF MAKING ALKOXYLATED ORGANOSILICONE RESINS AND THE RESINS PRODUCED THEREBY

BACKGROUND OF THE INVENTION

1. Field of the Invention.

The present invention relates generally to a method of making alkoxylated organosilicone resins and more particularly to a method that can introduce various functional and nonfunctional end-cap groups in the chemical structure of the resins.

2. Description of the Prior Art.

As used herein, the term "resin" describes a silicone composition wherein the molecular structure is arranged in a predominantly three dimensional network. Thus, the term silicone "resin" is used to distinguish the composition from silicone fluids, which are of a predominantly linear structure, and silanes. The silicone resins utilized as starting material in the present invention are macromolecular polymers comprised primarily of $R_3SiO_{1/2}$ and $SiO_{4/2}$ siloxy units, wherein R is a functional or nonfunctional organic radical. Such units are conventionally called M and Q units, respectively. Those skilled in the art will appreciate that such resins may also include a limited number of $R_2SiO_{2/2}$ and $RSiO_{3/2}$ siloxy units, conventionally referred to as D and T units, respectively. Generally speaking, the term "MQ resin" is used to describe organosilicone resins wherein the quantity of T and D units does not, on average, exceed 20 mole percent. Thus, organosilicone resins that primarily comprise M and Q units are frequently referred to as MQ resins.

MQ organosilicone resins may be produced by the methods disclosed in U.S. Pat. No. 2,676,182, Daudt et al., the teachings of which methods are incorporated herein by reference. The MQ resins of Daudt et al. are produced by the acid hydrolysis of a silicate, which is subsequently end-capped by reaction with a trialkylhalosilane or hexamethyldisiloxane. Thus, the MQ resins can be described by the empirical formula:

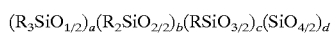

$(R_3SiO_{1/2})_a(R_2SiO_{2/2})_b(RSiO_{3/2})_c(SiO_{4/2})_d$ wherein: R is a methyl or OH group and a, b, c and d are zero or positive numerical values with the provisos that $a+b+c+d=1$, $0 \leq (b+c) \leq 0.2$ and the ratio of $a:(b+c+d)$ is between about 0.3 and 1.0.

Most often, the MQ resins have a number average molecular weight, Mn, between about 2,200 and about 7,000 and are generally prepared and sold in solution. When Mn is less than about 2,200, the resins retain the characteristics of a liquid, regardless of whether or not they are removed from solution. When Mn is greater than about 7,000, the resins are relatively insoluble in the preferred solvents. Likewise, when the ratio of $a:(b+c+d)$ is less than about 0.3, Mn is generally greater than 7,000 and when the ratio is greater than about 1.0, Mn is generally less than about 2,200.

Those skilled in the art will appreciate that end-capping a silicate hydrolyzate with a trialkylhalosilane or hexamethyldisiloxane renders a resin which has a substantial quantity of residual —OH groups associated therewith (often termed residual silanol.) Such residual silanol groups are properly designated as T units. It is known in the art to lower amount of residual silanol by further reaction of the resin with hexamethyldisilazane. Thus, as used herein, the term "MQ resin" also includes resins having either substantial residual silanol groups or reduced residual silanol.

It is also known that, of the residual silanol groups associated with MQ silicone resin, only a portion thereof are considered to be non-sterically hindered and thus capable of further reaction. Prior art methods have thus been limited in that the degree of alkoxy functionality which can be obtained thereby is determined by the concentration of non-sterically hindered residual silanol.

MQ resins made generally in accordance with the teachings of Daudt et al. are frequently described as being "benzene soluble." In reality, such resins are also soluble in a number of nonaromatic and aromatic organic solvents, including xylene and toluene. It is, however, also known to provide MQ resins in the form of spray-dried powders, as taught, for instance in U.S. Pat. No. 5,324,806 Wengrovius et al.

MQ resins have a variety of uses. They are frequently blended with silicone fluids in the manufacture of silicone pressure sensitive adhesives and rubbers. In such manufacture, it is known to cross-link the silicone fluids and resin with a cross-linking compound which reacts with functional groups associated with both the resin and fluid. Often the non-sterically hindered residual silanol groups associated with the resin serve as the functional groups. It is also known, however, to introduce functional groups, for example vinyl, by treating the resin with dimethylvinylchlorosilane.

Because of their versatile reactivity, alkoxylated organosilicone resins, whether or not they meet the definition of an MQ resin, are particularly useful as intermediate materials in the synthesis of silicone end-products, such as the aforementioned pressure sensitive adhesives.

Alkoxy functionality has been imparted to MQ resins by reacting the resin with an alcohol in the presence of a catalyst, such as tetrabutyl titanate. However, alkoxylation by this process is somewhat limited in that the degree of alkoxylation which can be achieved is only about 5 to 6 mole percent of the siloxy units. It is believed that this limit is due to the competing reaction involving intramolecular condensation of alkoxy sites.

The introduction of alkoxy functionality to MQ resins has been achieved via two other well-known methods which utilize reactions between alkoxy silanes and the non-sterically hindered residual silanol groups on the resin. Those skilled in the art will recognize that the two reactions are generally referred to as condensation and exchange, respectively. In the condensation reaction, an alcohol is produced in the formation of the Si—O—Si bond between the resin and silane. In the exchange reaction a direct substitution of the alkoxy group on the silane and the hydroxyl group on the resin occurs. Both reactions are generally carried out in the presence of a catalyst, such as tetrabutyl titanate. The drawback of either approach is again the limited degree of alkoxylation which may be achieved.

Thus, it would be highly desirable to provide a process for incorporating alkoxy functionality into an organosilicone resin, wherein the degree of alkoxylation of the resin was not so-limited as in the prior art methods.

BRIEF SUMMARY OF THE INVENTION

In accordance with the present invention, there is provided a novel method of making an alkoxylated organosilicone resin, which method overcomes the drawbacks of the prior art. The method of the invention comprises:

(I) reacting (A) an MQ organosilicone resin of the empirical formula

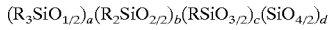

$(R_3SiO_{1/2})_a(R_2SiO_{2/2})_b(RSiO_{3/2})_c(SiO_{4/2})_d$ wherein: each R is independently a methyl or hydroxyl group and a, b, c and d are zero or positive numerical values with the provisos that a+b+c+d=1, 0≦(b+c)≦0.2 and the ratio of a:(b+c+d) is between about 0.3 and 1.0; and (B) at least one alkoxy silane selected from the group consisting of silanes having the empirical formula $$R_xSi(OR')_{(4-x)}$$

wherein x is 1, 2 or 3, R is a monovalent radical, which R groups are independently selected from the group consisting of alkyl, alkenyl, aryl, arylalkyl, epoxy, ether, alkylamide, alkylamine and each OR' is an alkoxy group;
in the presence of
(C) a catalytic amount of a basic catalyst; so as to produce an alkoxylated organosilicone resin; and
(II) thereafter neutralizing the basic catalyst (C).

In the preferred embodiment of the invention, an alcohol component (D) is included in the reacting step (I). In the most preferred embodiment of the invention, the alcohol (D) is of the general formula HOR', wherein R' is as defined above, and the alcohol (D) and alkoxy silane (B) have identical R' groups.

It is therefore an object of the present invention to provide a method making an alkoxylated organosilicone resin wherein a higher degree of alkoxylation, as compared to prior art methods, can be obtained.

Still another object of the present invention is to provide a method for making an alkoxylated organosilicone resin which can utilize an MQ resin and a monoalkoxysilane.

It is a feature of the method of the present invention that additional desirable organic groups, such as phenyl groups, along with alkoxy groups may be incorporated into the alkoxylated organosilicone resin of the invention.

It is yet another feature of the method of the invention that the number average molecular weight, Mn, and weight average molecular weight, Mw, of the alkoxylated organosilicone resin of the invention may be less than that of the starting MQ resin.

DETAILED DESCRIPTION OF THE INVENTION

In the method of the invention, component (A) is an MQ organosilicone resin of the empirical formula $$(R_3SiO_{1/2})_a(R_2SiO_{2/2})_b(RSiO_{3/2})_c(SiO_{4/2})_d$$

wherein each R is independently a methyl or hydroxyl group or and a, b, c and d are zero or positive numerical values with the provisos that a+b+c+d=1, 0≦(b+c)≦0.2 and the ratio of a:(b+c+d) is between about 0.3 and 1.0.

As previously mentioned, MQ resins may contain a limited number of D and T units. Thus, the value of parameters a, b, c and d are limited as set forth above such that the number of D and T units does not exceed 20 mole percent of the number of siloxy units.

Furthermore, the above limitations dictate that the number of M units must be greater than at least 0.3 of the sum of the number of D, T and Q units. The ratio of M units to the sum of D, T and Q units is inversely proportional to the molecular weight of the resin. Thus, when the ratio of M:(D+T+Q) is greater than about 1.0, the MQ resin behaves more as a liquid than a solid. Hence, when that ratio is in excess of 1.0, Mn of the resin is generally less than about 2,200. Conversely, when that ratio is less than about 0.3, Mn generally exceeds about 7,700 and the resin looses its solubility in the preferred solvents.

Component (B) of the invention is at least one alkoxy silane selected from the group of silanes having the empirical formula $$R_xSi(OR')_{(4-x)}$$

wherein x is 1, 2 or 3, R is a monovalent radical, which R groups are independently selected from the group consisting of alkyl, alkenyl, aryl, arylalkyl, epoxy, ether, alkylamide and alkylamine and each OR' is an alkoxy group. Because of availability, cost and reactivity, methoxy and ethoxy silanes are the most preferred.

It is important to note that component (B) does not include tetra alkoxy silanes. It was found that when a pure tetra alkoxy silane, such as tetra methoxy silane, was reacted with the MQ resins of component (A) in the presence of (C) a basic catalyst, the system had a tendency to produce an intractable precipitate. Those skilled in the art will recognize, however, that the use of a limited amount of a tetra alkoxy silane in combination with either mono-, di-, or trialkoxy silanes is not specifically excluded in the practice of the present invention, except to the extent that such inclusion leads to an unacceptable quantity of intractable precipitate.

It is also important to note that component (B), the alkoxy silane, can be used to introduce other radical groups, in addition to alkoxy groups, into the structure of the organosilicone resin of the invention. Therefore, groups that are independently selected from the group consisting of alkyl, alkenyl, aryl, arylalkyl, epoxy, ether, alkylamide and alkylamine can be incorporated into the resin.

While not wishing to be bound to any particular theory for the chemical mechanism of the method of the invention, it is demonstrated in the examples below that the formation of the alkoxylated organosilicone resin of the invention is augmented by the presence of an alcohol (D). When no intentional additions of alcohol are used in combination with an MQ resin, it is believed that the OR' groups of the alkoxy silane (B) react with the sterically unhindered hydroxyl groups of the resin to form such alcohol. Accordingly, the method of the invention can be practiced with or without intentional additions of alcohol (D) in (I) the reacting step. It is believed, however, that the combination of an alkoxy silane and an alcohol aid in the alkoxylation and is the preferred method of practicing the invention. In the most preferred method of the invention, the OR' groups of the alkoxysilane are identical to the OR' groups of the alcohol.

Component (C) of the invention comprises a catalytic amount of a basic catalyst. Suitable basic catalysts include but are not limited to NaOH, KOH, NaOCH$_3$, LiOH, potassium tertiary butoxide, LiOCH$_3$, KOCH$_3$, sodium silanolate and amines, such as ethanolamine and quaternary ammonium salts, such as tetrabutylammonium fluoride. It should be noted that amines and ammonium salts will serve to catalyze the reaction of the invention, but at a considerably slower rate when compared to the remaining aforementioned basic catalysts.

As used herein, the term "catalytic amount" is such an amount of catalyst that causes the reaction of the invention to proceed at a predetermined desired rate. The catalytic amount of catalyst will, of course, depend upon the type of basic catalyst, as some are more effective than others and the temperature at which the reaction is carried out.

In the preferred embodiment of the invention, the reacting step (I) is carried out under conditions of reflux. The reaction of the invention will proceed at room temperature conditions, but it is well-known in the art that reaction rates are accelerated at elevated temperatures. The MQ resin, as dissolved in an organic solvent, may be directly reacted. In one embodiment of the invention, a volatiles trap is employed which then substantially separates the and alcohols and volatile reaction products from the alkoxylated resin.

The present inventor has found that if large amounts of component (C), the basic catalyst, or if small amounts (either generated or added) of component (D), the alcohol, are employed, the reaction tends to produce varying amounts of an intractable precipitate. Conversely, employing lower levels of the basic catalyst (C) and greater amounts of alcohol (D) tends to reduce and can even suppress the formation of the intractable precipitate. The absolute quantities of components (C) and (D) depend, of course, on the quantity of MQ resin being processed and the particular catalyst (C) and alcohol (D) which are employed.

The neutralizing step (II) is easily carried out by the introduction of an acid, such as dry ice or acetic acid, to the reaction mixture, after the reacting step (I). Carbon dioxide is particularly useful in this regard as any excess will simply leave the reaction mixture in the form of vapor. Other useful neutralizing agents include chlorosilanes.

EXAMPLES

In the following examples, an alkoxylated organosilicone was produced in accordance with the present invention. In each example, the starting MQ resin (hereinafter referred to as "RES1") was dissolved in xylene at a concentration of 74 weight %. All weights of RES1 in the Examples refer to the combined weight of the resin and the xylene dispersant. Nuclear magnetic resonance ($^{29}$Si and $^{13}$C NMR) and silicone resin-calibrated gel permeation chromatography (GPC) were used to determine the general formula and molecular weight of RES1. The general formula comprised: 43 mole % M units of $(CH_3)SiO_{1/2}$; 12 mole % T units of $(OH)SiO_{3/2}$; and 45 mole % Q units of $SiO_{4/2}$. The number average molecular weight, Mn, was 4,549 and the weight average molecular weight, Mw, was 17,760.

Those skilled in the art will appreciate that the "T" units reported above and the below generally include a minor amount of sterically-hindered isopropoxy groups which occurred as a result of the RES1 synthesis. As reported herein, that minor amount of isopropoxy groups is ignored.

Example 1

A solution of 89% pure trimethylmethoxysilane was prepared by reacting two moles of methanol with two moles of hexamethyldisilazane and distilling off the trimethylmethoxy silane formed therefrom. 150 g of RES1 and 1.5 g of a solution of 25 weight % sodium methoxide basic catalyst dissolved in methanol were added to 150 g of the 89% pure trimethylmethoxysilane in a flask. The reaction mixture was heated to reflux (75° C.) for 17 hours. Thereafter, the flask was fitted with a Dean Stark trap and the reaction mixture again heated to 135° C. until the collected volatiles remained constant. 135 g of volatiles were collected in the trap. After cooling, the trap was removed and 1.5 g of trimethylchlorosilane was thoroughly blended with the reaction mixture to inactivate the sodium methoxide catalyst. The resulting composition was filtered through a mixture of sodium bicarbonate and diatomaceous earth (to remove the NaCl formed upon inactivation of the catalyst) yielding a clear filtrate. The filtrate was devolatilized in a vacuum chamber at 5 mm Hg and 80° C., thus producing 102 g of dry powder. GPC and NMR testing revealed that the resulting organosilicone resin had a general formula comprised of: 47.82 mole % M units of $(CH_3)SiO_{1/2}$; 2.72 mole % T units of $(CH_3O)SiO_{3/2}$; and 48.93 mole % Q units of $SiO_{4/2}$. The number average molecular weight, Mn, was 2,977 and the weight average molecular weight, Mw, was 5,086.

Example 2

100 g of propyltrimethoxysilane were combined with 200 g of RES1 and 0.75 g of a solution of 25 weight % sodium methoxide basic catalyst dissolved in methanol. The reaction mixture was heated at reflux (75° C.) for 5 hours. Thereafter, a solid piece of carbon dioxide was added to the reaction mixture to inactivate the sodium methoxide catalyst. The mixture was filtered and devolatilized as described above, yielding 188 g of a clear, viscous fluid. GPC and NMR testing showed that the resulting alkoxylated organosilicone resin had a general formula comprised of: 25.08 mole % M units of $(CH_3)_3SiO_{1/2}$; 3.63 mole % M units of $(CH_3O)_2(CH_3)SiO_{1/2}$; 1.09 mole % M units of $(CH_3O)_3SiO_{1/2}$; 10.7 mole % D units of $(CH_3O)(CH_3)SiO_{2/2}$; 6.02 mole % D units of $(CH_3O)_2SiO_{2/2}$; 12.02 mole % T units of $(CH_3)SiO_{3/2}$; 15.91 mole % T units of $(CH_3O)SiO_{3/2}$; and 25.39 mole % Q units of $SiO_{4/2}$. The number average molecular weight, Mn, was 2,338 and the weight average molecular weight, Mw, was 8,940.

Example 3

60 g of phenyltrimethoxysilane, 200 g of RES1 and 2.25 g of a solution of 25 weight % sodium methoxide basic catalyst dissolved in methanol were combined and heated at 145° C. under a Dean-Stark trap for six hours. 18 g of volatiles were collected in the trap. 3 g of trimethylchlorosilane were then added to the reaction mixture to neutralize the basic catalyst. The resulting mixture was then filtered and devolatilized as described above, yielding 198 g of a clear liquid. GPC and NMR testing showed that the resulting alkoxylated organosilicone resin had a general formula comprised of: 36.46 mole % M units of $(CH_3)_3SiO_{1/2}$; 1.90 mole % M units of $(CH_3O)_2(Ph)SiO_{1/2}$; 0.45 mole % M units of $(CH_3O)_3SiO_{1/2}$; 5.25 mole % D units of $(CH_3O)(Ph)SiO_{2/2}$; 3.57 mole % D units of $(CH_3O)_2SiO_{2/2}$; 6.67 mole % T units of $(Ph)SiO_{3/2}$; 12.29 mole % T units of $(CH_3O)SiO_{3/2}$; and 33.31 mole % Q units of $SiO_{4/2}$, where Ph represents a phenyl group. The number average molecular weight, Mn, was 2,110 and the weight average molecular weight, Mw, was 4,907.

Example 4

100 g of RES1, 65 g of methyltriethoxysilane and 0.5 g of a solution of 25 weight % sodium methoxide basic catalyst dissolved in methanol were combined and heated at 135° C. under a Dean-Stark trap for 17 hours. 10 ml of volatiles were collected in the trap. 1.5 g of trimethylchlorosilane were then added to the reaction mixture to neutralize the basic catalyst. The resulting mixture was then filtered and devolatilized as described above, yielding 105 g of a clear liquid. GPC and NMR testing showed that the resulting alkoxylated organosilicone resin had a general formula comprised of: 36.89 mole % M units of $(CH_3)_3SiO_{1/2}$; 0.53 mole % M units of $(CH_3)(EtO)_2SiO_{1/2}$; 0.85 mole % M units of $(EtO)_3SiO_{1/2}$; 6.04 mole % D units of $(CH_3)(EtO)SiO_{2/2}$; 3.23 mole % D units of $(EtO)_2SiO_{2/2}$; 10.9 mole % T units of $(CH_3)SiO_{3/2}$; 12.75 mole % T units of $(EtO)SiO_{3/2}$; and 28.61 mole % Q units of $SiO_{4/2}$, where Et represents an ethyl group. The number average molecular weight, Mn, was 1,457 and the weight average molecular weight, Mw, was 4,912.

Example 5

This Example was prepared to show that LiOH is an effective catalyst to carry out the method of the invention.

200 g of RES1, 200 g of methyltrimethoxysilane and 1.0 g of a solution of 10 weight % LiOH.H$_2$O basic catalyst dissolved in methanol were combined and heated at 100° C. under a Dean-Stark trap for 16 hours, until the collected volatiles remained constant. Thereafter, a solid piece of carbon dioxide was added to the reaction mixture to inactivate the basic catalyst. The mixture was not filtered and devolatilized as described above, and included a small quantity of unreacted methyltrimethoxy silane. GPC and NMR testing detected that the resulting alkoxylated organosilicone resin had a general formula which included M units of $(CH_3)SiO_{1/2}$; M units of $(CH_3O)_2(CH_3)SiO_{1/2}$; M units of $(CH_3O)_3SiO_{1/2}$; D units of $(CH_3O)(CH_3)SiO_{2/2}$; D units of $(CH_3O)_2SiO_{2/2}$; T units of $(CH_3)SiO_{3/2}$; T units of $(CH_3O)SiO_{3/2}$; and Q units of $SiO_{4/2}$ in indeterminate mole percents. The number average molecular weight, Mn, was 1,037 and the weight average molecular weight, Mw, was 7,600.

Comparative Example

In a known manner, an MQ resin having a drastically reduced sterically-unhindered residual silanol content, was prepared by heating an MQ resin solution (of the RES1 formulation) under conditions of reflux and in the presence of KOH. GPC and NMR testing showed that the MQ resin so-treated had a general formula comprised of: 42.77 mole % M units of $(CH_3)_3SiO_{1/2}$; 2.90 mole % T units of $(OH)SiO_{3/2}$; and 54.32 mole % Q units of $SiO_{4/2}$. In the MQ resin so-treated, Mn was 5,143 and Mw was 13,950. The treated resin was dissolved in a xylene solution at 50 weight % solids.

200 g of the treated resin solution, 100 g of 89% pure trimethylmethoxysilane and 0.25 g of anhydrous sodium methoxide powder were heated to reflux at 60° C. for 16 hours. Thereafter, a solid piece of carbon dioxide was added to the reaction mixture to inactivate the basic catalyst. The mixture was filtered and devolatilized as described above, yielding a solid powder. GPC and NMR testing showed that the resulting organosilicone resin so-treated had a general formula comprised of: 43.18 mole % M units of $(CH_3)_3SiO_{1/2}$; 3.79 mole % T units of $(OH)SiO_{3/2}$; and 52.93 mole % Q units of $SiO_{4/2}$. Mn was 4,892 and Mw was 13,010.

Accordingly, it appears that virtually no reaction occurred between the MQ resin and the monoalkoxy silane.

Example 6

The identical reaction set forth in the Comparative Example above was carried out except that 15 g of methanol were added to the reaction mixture before refluxing. GPC and NMR testing showed that the resulting organosilicone resin had a general formula comprised of: 47.11 mole % M units of $(CH_3)_3SiO_{1/2}$; 0.55 mole % D units of $(OCH_3)_2SiO_{2/2}$; 6.02 mole % T units of $(OCH_3)SiO_{3/2}$; and 46.12 mole % Q units of $SiO_{4/2}$. Mn was 3,338 and Mw was 7,714.

Thus, it is clear that the employment of methanol in the reaction step promoted the formation of and alkoxylated organosilicone resin from the MQ resin which had been treated so as to have an extremely low residual sterically-unhindered silanol concentration. It should be noted that this alkoxylation was carried out using a monoalkoxy silane in combination with the methanol.

In each of Examples 1–6, an alkoxylated organosilicone resin was successfully made from an MQ resin by employment of the method of the invention. From the Examples it is clear that the method of the invention may utilize mon-, di- and trialkoxy silanes. It is further clear that any number of basic catalysts can be employed and that the method of the invention can be used to incorporate other organic groups, such a phenyl groups, into the organosilicone resin formed thereby.

As can be seen from the Examples, the novel alkoxylated organosilicone resin compositions produced by the novel method of the present invention are comprised of siloxy groups according to the following the empirical formula ti $(R_3SiO_{1/2})_e(R_2(OR')SiO_{1/2}))_f((OR')_2RSiO_{1/2})_g$ $$((OR')_3SiO_{1/2})_h((OR')RSiO_{2/2})_i((OR')_2SiO_{2/2})_j$$

$$(RSiO_{3/2})_k((OR')SiO_{3/2})_l(SiO_{4/2})_m$$

wherein: each OR' is an alkoxy radical, which alkoxy radicals may be the same or different; each R radical is a monovalent radical independently selected from the group consisting of alkyl, alkenyl, aryl, arylalkyl, epoxy, ether, alkylamide, alkylamine and hydroxyl radicals; and e, f, g, h, i, j, k, l and m are zero or positive numerical values with the proviso that $$e+f+g+h+i+j+k+l+m=1.$$

In the preferred embodiment of the composition of the invention, the novel alkoxylated organosilicone resin has a higher degree of alkoxylation than was capable of being obtained by prior art methods. Accordingly, the preferred composition of the invention, independent of the method of the invention, includes more than about 6 mole percent alkoxylated siloxy units. Thus, $$f+g+h+i+j+l>0.06.$$

Surprisingly, the method of the invention is capable of producing organosilicone resins of the MDTQ-type having unusually high degrees of alkoxylation. In Example 2, for instance, 37 mole percent of the siloxy units are alkoxylated. The degree of alkoxylation can be controlled by varying the parameters of reaction time, the concentration of reactants and the temperature of reaction. Thus, the method of the invention permits the synthesis of novel alkoxylated organosilicone resins compositions wherein the more than 10, 20, 30 etc. mole percent of the siloxy groups are alkoxylated.

Also surpirizingly, the method of the invention produces an alkoxylated organosilicone resin that has extremely low levels of residual sialnol. As verified by proton NMR testing, the present inventor has found that residual silanol levels in the resins of the invention are typically below detecable limits (i.e. less than two mole percent of siloxy units.)

The above discussion relating to the preferred novel composition of the invention should not be confused with the novel method disclosed and claimed herein. Indeed, the method of the invention can be used to produce alkoxylated organosilicone resins which do not meet the limitations set forth above but which are, nonetheless, considered novel as a result of production by the novel method. See, for instance, Example 1 wherein the degree of alkoxylation is quite low.

From the Examples it is clear that the method of the invention can be used to produce an alkoxylated organosilicone resin that has a lower Mn and Mw than the MQ resin starting material. The method of the invention may then be characterized as having the ability to "digest" the MQ resin, while at the same time alkoxylating the composition. Thus, in another embodiment of the composition of the invention, the alkoxylated organosilicone resin is limited to including at least about 10 mole percent of siloxy units of the sum of the T and Q type in order to retain the substantially three dimentional macromolecular structure. This embodiment of the invention can be expressed in terms of the above empirical formulation wherein $$k+l+m \geq 0.10.$$

While the above Examples illustrate various features and advantages of the present invention, the scope of the invention should be defined only in accordance with the claims set forth below and equivalents thereof.

What is claimed is:

1. A method of producing an alkoxylated organosilicone resin, said method comprising the steps of:
   (I) reacting
      (A) an MQ organosilicone resin of the empirical formula $$(R_3SiO_{1/2})_a(R_2SiO_{2/2})_b(RSiO_{3/2})_c(SiO_{4/2})_d$$

wherein: each R is independently a methyl or hydroxyl group and a, b, c and d are zero or positive numerical values with the provisos that a+b+c+d=1, $0 \leq (b+c) \leq 0.2$ and the ratio of a:(b+c+d) is between about 0.3 and 1.0; and
      (B) at least one alkoxy silane selected from the group consisting of silanes having the empirical formula $$R_xSi(OR')_{(4-x)}$$

wherein x is 1, 2 or 3, R is a monovalent radical selected from the group consisting of alkyl, alkenyl, aryl, arylalkyl, epoxy, ether, alkylamide, alkylamine radicals and each OR' is an alkoxy group;
   in the presence of
      (C) a catalytic amount of a basic catalyst so as to produce an alkoxylated organosilicone resin; and
   (II) thereafter neutralizing the basic catalyst (C).

2. A method in accordance with claim 1 wherein said MQ organosilicone resin (A) has a number average molecular weight between about 2,200 and about 7,000.

3. A method in accordance with claim 2 wherein the alkoxylated organosilicone resin has a number average molecular weight that is less than the number average molecular weight of starting component (A).

4. A method in accordance with claim 1 further comprising the inclusion of a component (D) an alcohol in said reacting step (I).

5. A method in accordance with claim 4 wherein said alcohol, component (D), is of the general formula H(OR').

6. A method in accordance with claim 1 wherein said basic catalyst is selected from the group consisting of NaOH, KOH, NaOCH$_3$, LiOH, potassium tertiary butoxide, LiOCH$_3$, KOCH$_3$, sodium silanolate, ethanolamine and tetrabutylammonium fluoride.

7. A method in accordance with claim 1 wherein said reacting step (I) is carried out under conditions of reflux.

8. A method in accordance with claim 1 wherein said MQ organosilicone resin (A) is dissolved in an aromatic solvent.

9. A method in accordance with claim 4 further comprising the step of (III) removing said alcohol (D) during said reacting step (I).

10. A method in accordance with claim 1 wherein said neutralizing step (II) is carried out by adding an acid to the reaction product of components (A) and (B) in the presence of (C).

11. A method in accordance with claim 1 wherein said neutralizing step (II) is carried out by adding a chlorosilane to the reaction product of components (A) and (B) in the presence (C).

12. The alkoxylated organosilicone resin produced as a result of carrying out the method of claim 1.

13. The alkoxylated organosilicone resin produced as a result of carrying out the method of claim 4.

14. The alkoxylated organosilicone resin produced as a result of carrying out the method of claim 5.

15. A composition comprising an alkoxylated organosilicone resin having siloxy groups according to the following the empirical formula $$(R_3SiO_{1/2})_e(R_2(OR')SiO_{1/2+ee})_f((OR')_2RSiO_{+e,\text{fra }1/2})_g$$
$$((OR')_3SiO_{1/2})_h((OR')RSiO_{2/2})_i((OR')_2SiO_{2/2})_j$$
$$(RSiO_{3/2})_k((OR')SiO_{3/2})_l(SiO_{4/2})_m$$

wherein: each OR' is an alkoxy radical, which alkoxy radicals may be the same or different; each R radical is a monovalent radical independently selected from the group consisting of alkyl, alkenyl, aryl, arylalkyl, epoxy, ether, alkylamide, alkylamine and hydroxyl radicals; and e, f, g, h, i, j, k, l and m are zero or positive numerical values with the provisos that $$e+f+g+h+i+j+k+l+m=1 \text{ and}$$
$$f+g+h+i+j+l>0.06.$$

16. A composition in accordance with claim 15 wherein $$f+g+h+i+j+l>0.10.$$

17. A composition in accordance with claim 16 wherein $$f+g+h+i+j+l>0.20.$$

18. A composition in accordance with claim 17 wherein $$f+g+h+i+j+l>0.30.$$

19. A composition in accordance with claim 18 wherein f+g+h+i+j+l>0.35.

20. A composition in accordance with claim 15 wherein k+l+m≧0.10.

21. A composition in accordance with claim 15 wherein the number of siloxy groups that include R radicals as hydroxy radicals is less than about two mole percent.

* * * * *